US006154602A

United States Patent [19]

Lee

[11] Patent Number: 6,154,602

[45] Date of Patent: Nov. 28, 2000

[54] EQUALIZER FOR DIGITAL VIDEO DISK PLAYER

[75] Inventor: Jong-Soo Lee, Suwon, Rep. of Korea

[73] Assignee: Hyundai Electronics Ind. Co., Ltd., Kyoungki-do, Rep. of Korea

[21] Appl. No.: 09/012,053

[22] Filed: Jan. 22, 1998

[30] Foreign Application Priority Data

Feb. 2, 1997 [KR] Rep. of Korea ........................ 97-1088

[51] Int. Cl.[7] ........................ H04N 5/76

[52] U.S. Cl. ........................ 386/113; 360/65

[58] Field of Search ........................ 386/113–115, 21; 360/65; 375/229, 230, 231, 232, 233, 234, 235, 236; H04N 5/76, 5/92, 9/79

[56] References Cited

U.S. PATENT DOCUMENTS 5,786,951 7/1998 Welland et al. .......................... 360/65
5,818,655 10/1998 Satoh et al. .......................... 360/65
5,886,844 3/1999 Shimizu .......................... 360/65
5,946,154 8/1999 Ino .......................... 360/65

*Primary Examiner*—Thai Tran
*Attorney, Agent, or Firm*—Lawrence G. Kurland, Esq.; Bryan Cave LLP

[57] ABSTRACT

An equalizer for a digital video disk player which is capable of obtaining a 5-tap transversal filter effect by providing a 3-tap transversal filter, reducing the number of elements, and obtaining a reliable 5-tap frequency characteristic. The equalizer includes first through third buffers for preventing a jittering problem of an RF signal due to a delay time, a 2T delay unit for 2T-delaying an output signal from the first buffer, a 4T delay unit for 4T-delaying an output signal from the third buffer, a summing unit for summing output signals from the first and third buffers with an output signal from the second buffer, and a low pass filter for allowing the summed output signals from the summing unit to have an equalizer characteristic suggested in the DVDP specification.

4 Claims, 6 Drawing Sheets

RF
3RD BUFFER
2ND BUFFER
1ST BUFFER
13
12
11
4T DELAY
2T
2T
15
2T DELAY
14
SUMMING PART
20
LOW-PASS FILTER
30
OUTPUT

RF
11
12
13
14
15
2T
2T
V4
V0
V2
20
Vout
30

EQUALIZER FOR DIGITAL VIDEO DISK PLAYER

BACKGROUND OF THE INVENTION

1. Field of the Invention

The present invention relates to an equalizer for a digital video disk player (DVDP), and in particular, to an improved equalizer for a DVDP which is capable of obtaining a 5-tap transversal filter effect by providing a 3-tap transversal filter which is used for a DVD-P, a DVD-ROM, etc.

2. Description of the Conventional Art

Conventionally, the equalizer is used for wave-shaping an RF (Radio Frequency) signal obtained by an optical pickup apparatus, processing a signal amplitude of a low level and high frequency such as, by way of example, (where T=33.3 nsec), 4T, or 5T, and increasing the entire gain, thus improving any signal interference and jitter problem.

Therefore, more accurate EFM (Eight- Fourteen Modulation) data is obtained using the equalizer.

FIG. 1, which is labeled prior art, is a view illustrating a conventional 5-tap construction. As shown therein, the RF signal flows through four delay lines composed of a T-structure. In this arrangement, the output signal from an equalizer is obtaining by multiplying the output signal from each delay unit and the coefficient C and adding the same.

In addition, the transfer characteristic of the above-described prior art construction may be expressed as the following Equation 1:

$$G_5(Z)=Z^{-2}-C(1+Z^{-1}+Z^{-3}+Z^{-4})$$

where $G_5$ denotes a transfer function of a transversal filter when configuring the 5-tap construction, and Z denotes a delay function.

In a DVDP specification, it is recommended to use a 5-tap transversal filter type equalizer. However, an equalizer chip which is capable of performing a 5-tap function has not yet developed.

Therefore, in order to implement the above-described 5-tap transversal filter, the delay line and modules have been designed to use a separate discrete device such as a resistor, condenser, arithmetic operation amplifier, etc.

Namely, it is difficult to fabricate a delay unit of more than 100 nsec using one filter. In addition, it is difficult to obtain a short delay time by connecting in series the same. The above-described problem occurs due to the impedance matching problem before and after the delay device and the noise of the devices.

Therefore, there has been a need to develop a method by which it is possible to minimize the number of elements for a digital video disk player, thus performing a 5-tap function.

SUMMARY OF THE INVENTION

Accordingly, it is an object of the present invention to provide an improved equalizer for a digital video disk player (DVDP) which overcomes the aforementioned problems encountered in the prior art.

It is another object of the present invention to provide an improved equalizer for a DVDP which is capable of obtaining a 5-tap transversal filter effect by providing a 3-tap transversal filter which is used for a DVD-P, a DVD-ROM, etc.

It is another object of the present invention to provide an improved equalizer for a DVDP which is capable of obtaining a 5-tap transversal filter effect by providing a 3-tap transversal filter, reducing the number of elements, and obtaining a reliable 5-tap frequency characteristic.

In order to achieve the above objects, there is provided an equalizer for a DVDP according to a first embodiment of the present invention, which includes first through third buffers for preventing a jittering problem of an RF signal due to a delay time, a 2T delay unit for 2T-delaying an output signal from the first buffer, a 4T delay unit for 4T-delaying an output signal from the third buffer, a summing unit for summing the delayed output signals from the first and third buffers with an output signal from the second buffer, and a low pass filter for allowing the output signals from the summing unit to have the equalizer characteristic suggested in the DVDP specification.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
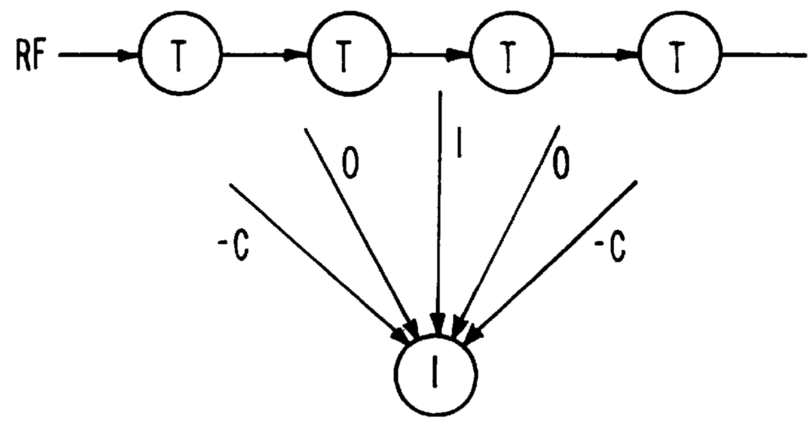
FIG. 1 is a view illustrating a conventional prior art 5-tap construction.
Figure 2:
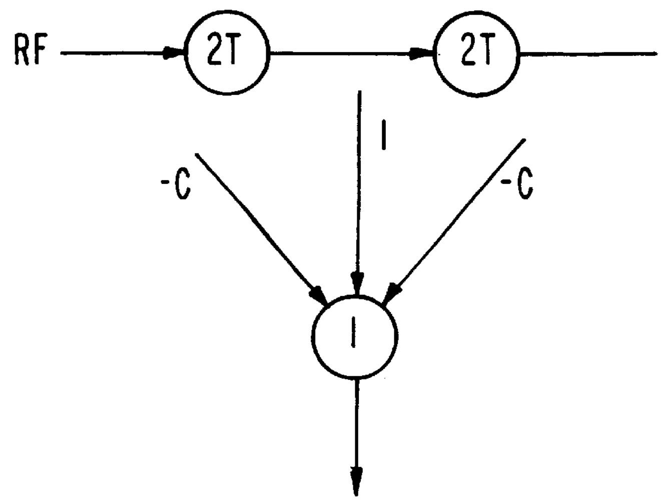
FIG. 2 is a graph illustrating a 3-tap construction according to the present invention.

Referring now to the drawings in detail, FIG. 2 is a diagrammatic illustration of a 3-tap construction according to the present invention in which one delay unit is configured to have 2T (66.6 nsec assuming T is 33.3 nsec), thus enabling the 3-tap construction.

Figure 3:
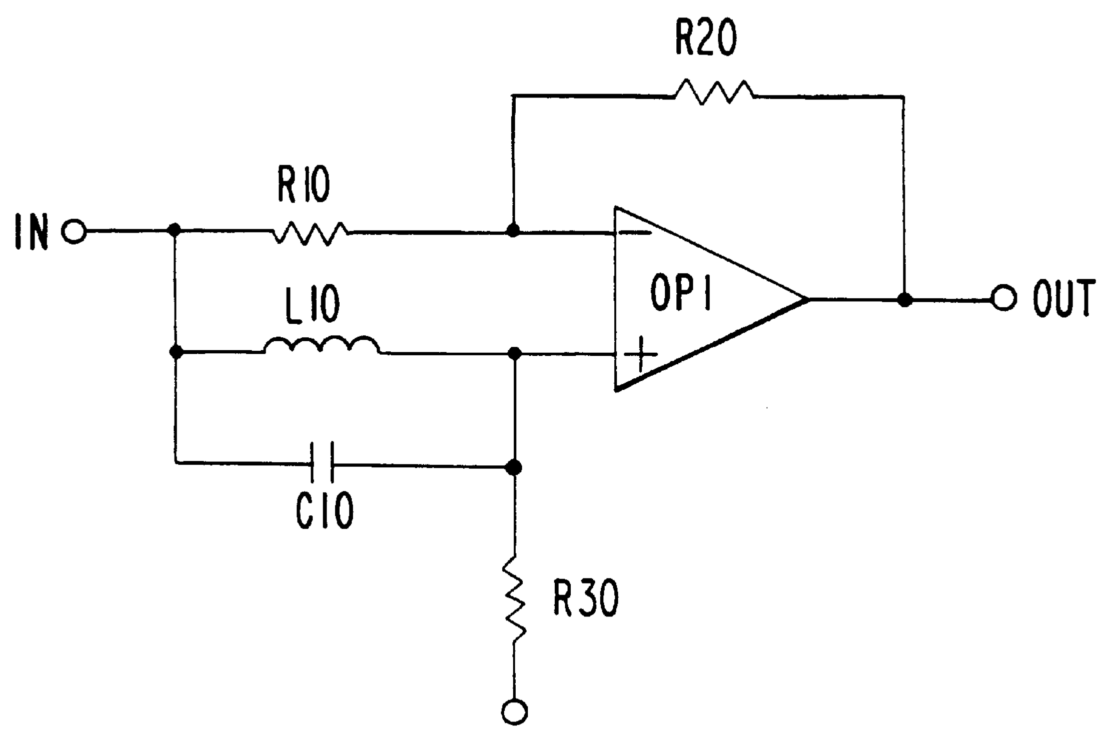
FIG. 3 is a schematic view illustrating an all pass filter for performing a predetermined delay function according to the present invention.

FIG. 3 is a schematic illustrating an all pass filter for performing a predetermined delay function according to the present invention. As shown therein, the all pass filter according to the present invention includes a resistor R10 connected with an inverted terminal (−) of an arithmetic operation amplifier OP1 for limiting current flow of a signal inputted through an input terminal IN, a resistor R20 for determining an amplifying ratio of the arithmetic operation amplifier OP10, an inductor L10 one side of which is connected in parallel with the input terminal IN and the other side of which is connected in series with a non-inverted input terminal (+) of the arithmetic operation amplifier OP1, a capacitor C10 connected in parallel with the inductor L10, and a resistor R30 commonly connected with the non-inverted input terminal (+) of the arithmetic operation amplifier OP1, the inductor L10 and the capacitor C10. Here, the resistors R10 through R30 are a main factor in determining the delay time.

Figure 4:
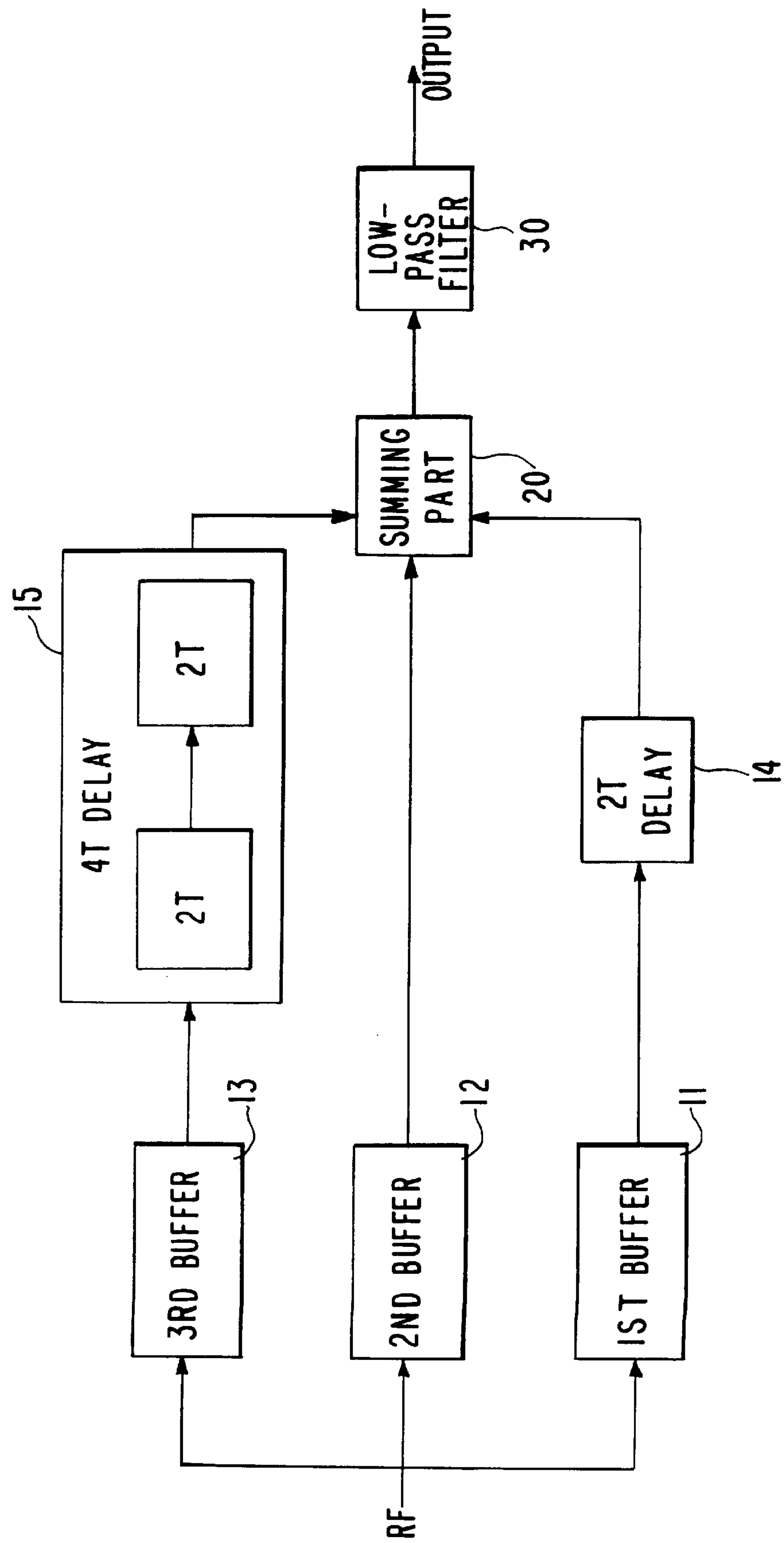
FIG. 4 is a block system diagram illustrating an equalizer using a 3-tap construction according to the present invention.

FIG. 4 is a block diagram which illustrates a circuit using the filter of FIG. 3. As shown therein, there are provided first through third buffers 11 through 13 for preventing jittering problems of RF signals due to a delay time, a 2T delay unit 14 connected with the first buffer 11, a 4T delay unit 15 connected with the third buffer 13, a summing unit 20 for summing the output signal from the second buffer 12 and the output signals from the second buffer 12 and the delay units 14 and 15, and a low pass filter 30 for allowing the output signals from the summing unit 20 to have an equalizer characteristic suggested in the DVDP specification.

Figure 5:
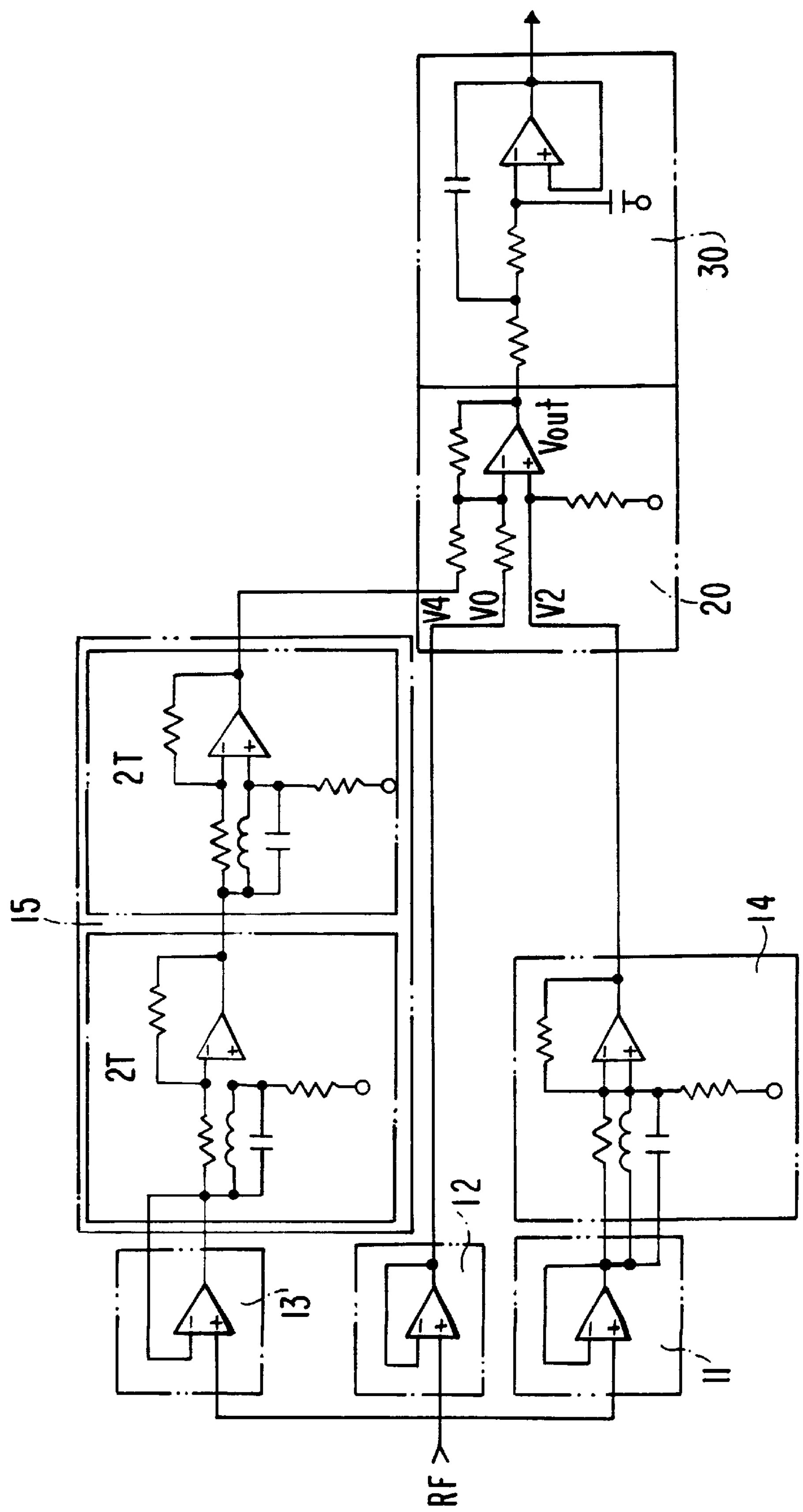
FIG. 5 is a schematic diagram of the system of FIG. 4.

FIG. 5 is a detailed schematic diagram of FIG. 4. As shown therein, the 2T delay unit 14 is composed of the filter of FIG. 3, and the 4T delay unit 15 is composed of the two series filters of FIG. 3.

The transfer function H(S) of the filter shown in FIG. 3 may be expressed as the following Equation 2:

$$H(S) = \frac{R30}{Z(S) + R30}\left(1 + \frac{R20}{R10}\right) - \frac{R20}{R10}$$

where $$Z(S) = \frac{SL}{S^2 LC + 1},$$

and S denotes a complex frequency having a value of $j2\pi f$.

Figure 7:
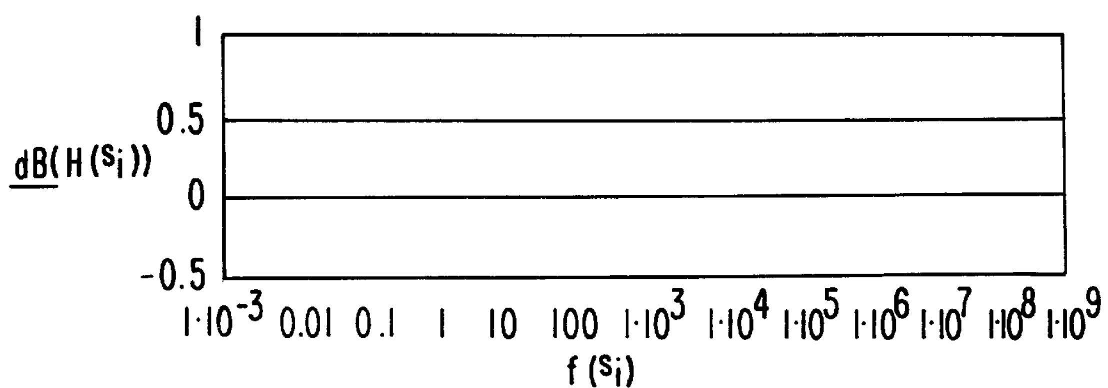
FIG. 7 is a graph illustrating a gain characteristic of an all pass filter according to the present invention.
Figure 8:
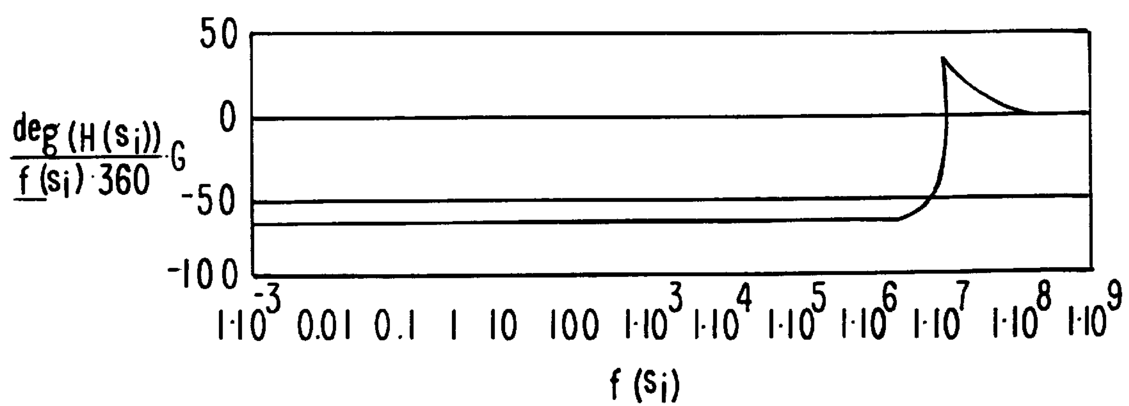
FIG. 8 is a graph illustrating a delay characteristic of an all pass filter according to the present invention.

In addition, FIGS. 7 and 8 graphically illustrate the gain and delay characteristic curves respectively, with respect to the transfer functions. As shown therein, if the RF signal used in the DVDP is about 5 MHz in which the 3T signal is a high frequency, and up to 5 MHz in the delay curve, it is possible to obtain a uniform delay signal characteristic.

As shown in FIG. 4, in more detail, it is possible to output an RF signal which is equalized by the low pass filter 30 by summing, using the summing unit 20, the signals which are obtained by multiplying the RF input signal and the coefficient C using the second buffer 12, the signals which are obtained by multiplying the signals that the RF input signal is 2T-delayed by the first buffer 11 and the 2T delay unit 14 and the coefficient C, and the signals which are obtained by multiplying the signals which are 4T-delayed by the third buffer 13 and the fourth delay unit 15 and the coefficient C. The above-described arrangement has a construction and characteristic which are similar with that of a 5-tap equalizer.

Here, the summing unit 20 performs the arithmetic operation with respect to $G_{35}(Z)=Z^{-2}-C(1+Z^{-4})$. Here, the values of the resistors are set to satisfy C=0.14. The summing unit 20 performs an arithmetic operation with respect to $Vout=V_2-0.14(V_0+V_4)$.

In addition, the low pass filter 30 is used for allowing the cutoff frequency suggested in the DVDP specification to have $f_c$=8.2 MHz. At this time, the transfer function T(S) may be expressed in the following Equation 3:

$$T(S) = \frac{\frac{1}{C1C2R1R2}}{S^2 + \frac{C2R2 + C2R2}{C1C2R1R2}S + \frac{1}{C1C2R1R2}}$$

Figure 6:
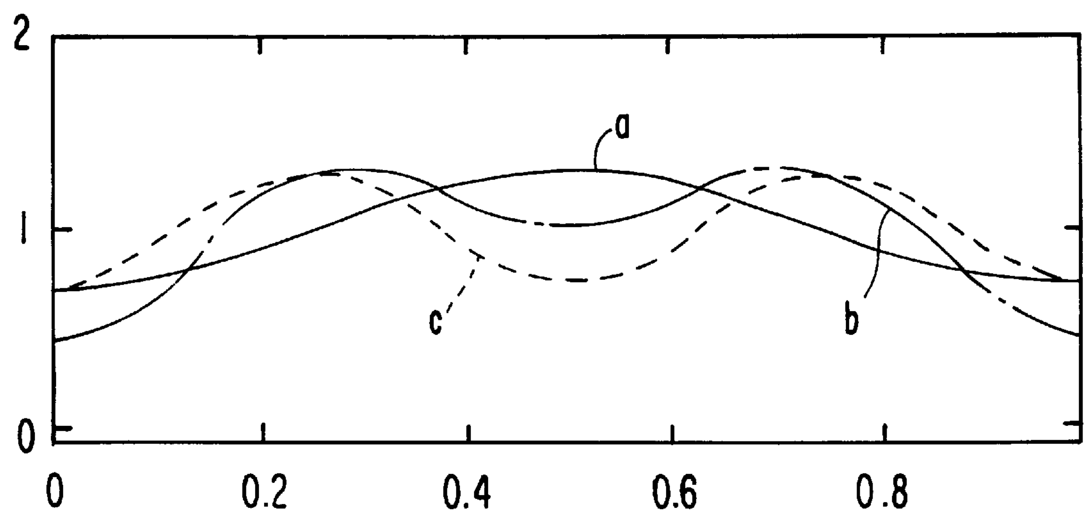
FIG. 6 is a graph illustrating a gain characteristic of an equalizer of a 5-tap and 3-tap construction according to the present invention.

FIG. 6 is a graph illustrating a gain characteristic of an equalizer of a 5-tap and 3-tap construction according to the present invention, where "a" denotes an original 3-tap construction, "b" denotes an original 5-tap construction, "c" denotes a gain characteristic of the 3-tap construction adapting the 2T delay unit according to the present invention. Here, "b" and "c" have similar characteristic.

As shown therein, it is possible to obtain the best characteristic of 4T when connecting in series 2T and 4T and the all pass filter which is capable of maintaining a constant delay characteristic in all frequency band widths.

As described above, in the 3-tap equalizer according to the present invention, the levels of the signals which pass through the equalizer are increased. Among the signals, the high frequency and low level signals are increased more. Therefore, the equalizer for a digital video disk player according to the present invention is well applicable to the CD-ROM drive and DVD-ROM drive.

In addition, since it is possible, in accordance with the present invention, to implement a 5-tap effect using the above described 3-tap construction, the number of elements is significantly reduced, and it is possible to fabricate a filter which has a larger mounting area and is capable of effectively preventing noises. In addition, the equalizer for the DVDP may be used as the ASIC basic circuit.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An equalizer for a digital video disk player (DVDP) having a predetermined specification, comprising:

means for receiving an RF signal input;

first, second, and third buffer means connected to said input means for preventing any jittering problem associated with said RF signal due to a delay time for said RF signal;

a 2T delay means connected to an output of said first buffer means for 2T-delaying an output signal from the first buffer means output for providing a 2T delayed output signal;

a 4T delay means connected to an output of said third buffer means for 4T-delaying an output signal from the third buffer means output for providing a 4T delayed output signal;

a summing means connected to said 2T and 4T delayed output signals and to an output of said second buffer means for summing said output signals for providing a summed output signal; and a low pass filter means connected to said summed output signal for allowing the summed output signals from the summing means to have an equalizer characteristic corresponding to said predetermined specification.

2. The equalizer of claim 1, wherein said 2T delay means comprises an all pass filter means which is capable of maintaining a predetermined delay time in a wide frequency band width.

3. The equalizer of claim 2, wherein said all pass filter means comprises an input terminal IN:

an arithmetic operational amplifier means having an inverted input terminal (−) and a non-inverted input terminal (+):

a first resistor means connected between said inverted terminal (−) of said arithmetic operation amplifier means and said input terminal IN for limiting current flow of a signal inputted through said input terminal IN;

a second resistor means connected to said arithmetic operation amplifier means for determining an amplifying ratio of the arithmetic operation amplifier means;

an inductor means, one side of which is connected in parallel with the input terminal IN and the other side of which is connected in series with said non-inverted input terminal (+) of the arithmetic operation amplifier means;

a capacitor means connected in parallel with the inductor means; and a third resistor means commonly connected with the non-inverted input terminal (+) of the arithmetic operation amplifier means, the inductor means and the capacitor means.

4. The equalizer of claim 1, wherein said 4T delay means comprises two 2T delay lines which are connected in series.

* * * * *

UNITED STATES PATENT AND TRADEMARK OFFICE
CERTIFICATE OF CORRECTION

PATENT NO. : 6,154,602
DATED : November 28, 2000
INVENTOR(S) : Jong-Soo Lee

It is certified that error appears in the above-identified patent and that said Letters Patent is hereby corrected as shown below:

Title page,
Foreign Application Priority Data, please change "97-1088" to -- 97-17088 --;
ABSTRACT, line 10, after the second occurrence of "summing", insert -- the delayed --.

Signed and Sealed this

Thirtieth Day of April, 2002

*Attest:*

JAMES E. ROGAN
*Director of the United States Patent and Trademark Office*

*Attesting Officer*